United States Patent [19]

Tanaka

[11] Patent Number: 4,715,729
[45] Date of Patent: Dec. 29, 1987

[54] ROLLER BEARING FOR INFINITE RECTILINEAR MOTION

[75] Inventor: Kazuhiko Tanaka, Yokohama, Japan
[73] Assignee: Nippon Thompson Co., Ltd., Tokyo, Japan
[21] Appl. No.: 13,563
[22] Filed: Feb. 11, 1987
[30] Foreign Application Priority Data
Aug. 19, 1986 [JP] Japan .................. 61-191969
[51] Int. Cl.$^4$ ........................................ F16C 29/06
[52] U.S. Cl. ................................................ 384/44
[58] Field of Search .................... 384/44, 43, 45; 464/168

[56] References Cited
U.S. PATENT DOCUMENTS

| | | | |
|---|---|---|---|
| 3,758,176 | 9/1973 | Stapley | 384/44 |
| 4,556,262 | 12/1985 | Geka | 384/44 |
| 4,563,045 | 1/1986 | Katayama | 384/44 |
| 4,603,922 | 8/1986 | Teramachi | 384/44 |

*Primary Examiner*—Lenard A. Footland
*Attorney, Agent, or Firm*—Trexler, Bushnell, Giangiorgi & Blackstone, Ltd.

[57] ABSTRACT

There is a parallel roller type roller bearing for an infinite rectilinear motion in which cylindrical rollers move in an infinite circulating passage. Two side plates are attached to both ends of the bearing unit, and a direction change passage communicated with the truck groove and formed in the same horizontal plane is formed in the side plate. A twisting passage is formed between the direction change passage and the truck groove. In the twisting passage, the cylindrical roller is gradually twisted until the central axis of the roller becomes vertical and is shifted from the truck groove into the unloaded region. In the cross section which is perpendicular to the slide direction of the bearing, the center of curvature of the twisting passage is located in the region contained by the extension line of the truck surface of the truck rail and the extension line of the end surface of the roller existing in the outside of the truck rail. The radius of curvature of the twisting passage is large at a location near the truck groove and is small at a location away from the truck groove. The twisting passage is formed such that the locus of the center of gravity of the roller, which moves in the twisting passage, draws cosine curve or single arc. Thus, the rollers can be stably and certainly twisted and shifted in the twisting passage. The slide resistance of the bearing is small and the bearing is miniaturized.

6 Claims, 15 Drawing Figures

FIG. 12A

THE LOCUS OF THE CENTER OF GRAVITY OF
THE ROLLER IS THE COSINE CURVE

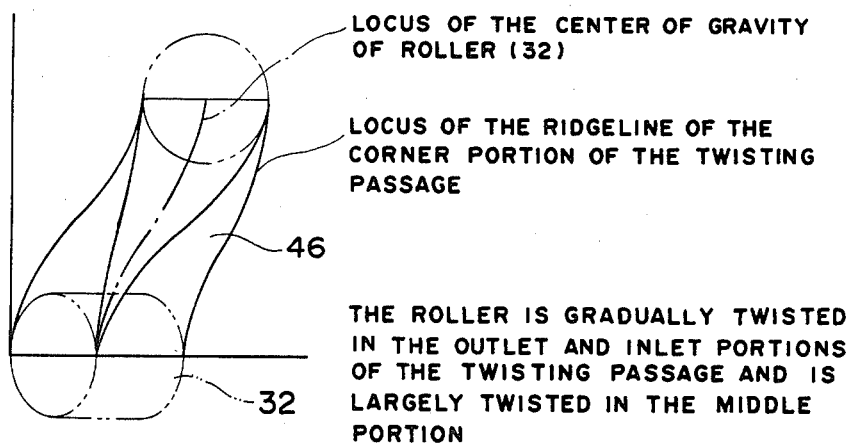

LOCUS OF THE CENTER OF GRAVITY OF ROLLER (32)

LOCUS OF THE RIDGELINE OF THE CORNER PORTION OF THE TWISTING PASSAGE

THE ROLLER IS GRADUALLY TWISTED IN THE OUTLET AND INLET PORTIONS OF THE TWISTING PASSAGE AND IS LARGELY TWISTED IN THE MIDDLE PORTION

FIG. 12B

FORMED BY A SINGLE ARC

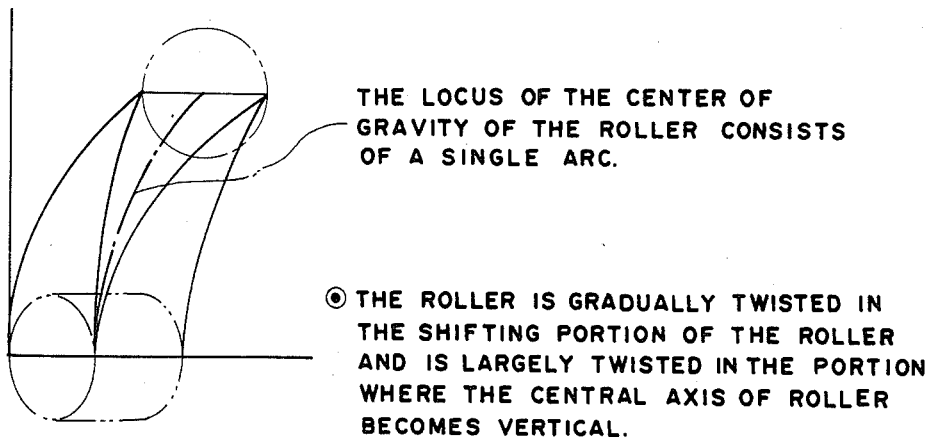

THE LOCUS OF THE CENTER OF GRAVITY OF THE ROLLER CONSISTS OF A SINGLE ARC.

⊙ THE ROLLER IS GRADUALLY TWISTED IN THE SHIFTING PORTION OF THE ROLLER AND IS LARGELY TWISTED IN THE PORTION WHERE THE CENTRAL AXIS OF ROLLER BECOMES VERTICAL.

CURVE IN WHICH THE LOCUS OF THE CENTER OF GRAVITY OF THE ROLLER IS NEAR THE STRAIGHT LINE

◉ THE TWISTING AMOUNTS ARE SUBSTANTIALLY EQUALIZED IN EACH OF THE TWISTING PASSAGES

ROLLER BEARING FOR INFINITE RECTILINEAR MOTION

BACKGROUND OF THE INVENTION

1. Field of the Invention

The present invention relates to a roller bearing for an infinite rectilinear motion and, more particularly, to a roller bearing of this type including a long truck rail and a slide unit which is arranged so as to ride over the truck rail and relatively performs the infinite rectilinear motion along the truck rail using cylindrical rollers as rolling elements.

Practically speaking, this invention relates to a roller bearing for an infinite rectilinear motion of what is called a parallel roller type in which cylindrical rollers are arranged on the truck surface of a truck rail where these rollers roll in a manner such that the central axes of the rollers are parallel with each other and are directed in the same direction.

2. Prior Arts

The roller bearings for an infinite rectilinear motion are classified into the cross roller type and the parallel roller type in dependence on a method of arrangement of the rollers. In the cross roller type, the central axes of the rollers perpendicularly cross each other in the rectilinear passage of the infinite circulating passage. In the parallel roller type, the respective rollers are arranged such that their central axes are directed in the same direction in the rectilinear passage.

In the case of the cross roller type, a single flow of rolling rollers is respectively provided on both of the right and left sides of the truck rail, namely, total two flows of rolling rollers are provided, thereby making it possible to load a weight in every direction. Thus, the whole bearing size is miniaturized and the number of parts is also reduced.

However, in the case of the cross roller type, a weight in a fixed direction is loaded by every other rollers in the truck surface. Therefore, to increase the rated weight, the load performance of the bearing must be increased by making the length of truck groove long. Therefore, if the cross roller type is used, the bearing becomes long in the slide direction and miniaturization of the bearing is obstructed.

On the other hand, in the case of the bearing of the parallel roller type in which the rollers in the rectilinear passage are arranged such that their central axes are directed in the same direction, all of the rollers in each truck groove can share the weight, so that this type of bearing has a high weight loading performance. However, in order to load the weight in every direction, every two flows of rolling rollers, namely, total four flows of rolling rollers are necessary for the right and left sides. An increase in number of flows of rolling rollers causes the height of cross section of the bearing to be enlarged.

The case of the parallel roller type bearing will be explained with reference to FIG. 1. In this case, since FIG. 1 is symmetrical in the horizontal direction with respect to a center line C, reference numerals are written on only the left side of the center line C. When a slide unit 1 is mounted so as to ride over a truck rail 2, rollers 3 and 3A are arranged at a predetermined angle of inclination (45°) for the center line C in a manner such that the extension lines (not shown) of the central axes (rotational axes) of the rollers 3 and 3A cross perpendicularly each other in order to also load the weight in every direction. Return passages 4 and 4A are formed in the slide unit 1. Two truck grooves in which the rollers 3 and 3A exist are communicated with the return passages 4 and 4A through direction change passages 5 and 5A.

In order to enable the rollers to smoothly roll in the truck grooves, direction change passages 5 and 5A, and return passages 4 and 4A, the return passages 4 and 4A need to be formed at the positions which are inclined with regard to the horizontal directions from two truck grooves and at the same time, the angles of inclination for the horizontal lines of the return passages 4 and 4A need to be the same as the angles of inclination (45°) of the rollers 3 and 3A for the center line C. A height $h_1$ of the slide unit 1 which satisfies the above conditions is, in general, very larger as compared with the case of the cross roller type bearing. Namely, according to the conventional parallel roller type bearing, the height of cross section of the bearing cannot help increasing in terms of the motion characteristics of rollers (for example, refer to Japanese Patent Application No. 181431-1982, and the like), and the number of parts also increases and the bearing becomes expensive.

To reduce the height of slide unit, there has been proposed a method whereby the truck grooves, direction change passages 5 and 5A, and return passages 4 and 4A are arranged in a positional relation as shown in FIG. 2. In this case, a height $h_2$ of the slide unit 1 is fairly smaller than the height $h_1$ in the case of FIG. 1. However, it is remarkably difficult to work and form the inside of the slide unit 1 such that the direction change passages 5 and 5A don't mutually cross, and very complicated and difficult machining processes are necessary. The manufacturing cost is also high.

SUMMARY OF THE INVENTION

The present invention is made in consideration of the foregoing drawbacks of the conventional parallel roller type roller bearing for a rectilinear motion. It is an object of the invention to provide a roller bearing for an infinite rectilinear motion in which the size is small and the load capacity is large and which can be cheaply manufactured.

According to the present invention, this object is accomplished by a roller bearing for an infinite rectilinear motion comprising:

a long truck rail in which an inclined surface formed in a part of an outside wall surface is used as a truck surface;

a slide unit which rides over the truck rail and in which a truck surface is formed at a location which faces the truck surface;

a number of cylindrical rollers arranged between the truck surface of the truck rail and the truck surface of the slide unit on the basis of a parallel roller type;

a truck groove including the truck surface;

an infinite circulating passage for the cylindrical rollers including the truck groove; and the truck groove and the infinite circulating passage being formed in the slide unit; characterized in that side plates are attached to both end portions of the slide unit, within each of which plate (24) a direction change passage being communicated with the truck groove and being located in the same horizontal plane as the truck groove is formed;

a twisting passage is formed between the direction change passage and the truck groove, in which twisting passage each of the cylindrical rollers moves so as to be gradually twisted until a central axis of the cylindrical roller is located in a vertical direction, and at the same time, the cylindrical roller moves from the truck groove into an unloaded region so as to be shifted, and in cross section which is perpendicular to a slide direction of the bearing, a center of curvature of the twisting passage is located in a region which is contained by an extension line of the truck surface of the truck rail and an extension line of an end surface of the roller in the outside of the truck rail.

In the cross section which is perpendicular to the slide direction of the bearing, the center of curvature is preferably located on the extension line of the truck surface of the truck rail.

On the other hand, in the cross section which is parallel with the slide direction of the bearing, the twisting passage is preferably formed in a manner such that a radius of curvature is large at a location near the truck groove, and a radius of curvature is reduced as the twisting passage is away from the truck groove. In this case, it is desirable that the twisting passage is formed in a manner such that the locus of the center of gravity of the cylindrical roller which moves in the twisting passage draws a cosine curve.

Further, the twisting passage may be also formed in a manner such that in the cross section which is parallel with the slide direction of the bearing, the locus of the center of gravity of the cylindrical roller which moves in the twisting passage draws a single arc or a curve near a straight line.

By forming the twisting passage as mentioned above, even in the case of the parallel roller type roller bearing, the truck groove, direction change passage, and return passage can be formed in substantially the same horizontal plane. Therefore, as compared with the conventional parallel roller type roller bearing, the bearing dimensions can be miniaturized and the infinite circulating passage can be easily worked.

Further, since the position of the center of curvature of the twisting passage is limited in the region which is surrounded by two extension lines mentioned above, the rollers in the truck groove can be smoothly shifted into the unloaded region.

Moreover, if the radius of curvature of the twisting passage is set to be large at a location near the truck groove and is reduced as the twisting passage is away from the truck groove, the foregoing action to move the cylindrical rollers so as to be smoothly shifted can be further enhanced in a preferable form.

In addition, if the twisting passage is formed in a manner such that the locus of the center of gravity of the cylindrical roller which moves in the twisting passage draws cosine curve, single arc, or curve near a straight line, the cylindrical rollers can be further smoothly moved.

The above and other objects, features, and advantages of the present invention will become more apparent from the following detailed description and the appended claims, with reference to the accompanying drawings.

BRIEF DESCRIPTION OF THE DRAWINGS

FIGS. 12A, 12B, and 12C are diagrams for explaining the curves which form the twisting passage.

DESCRIPTION OF THE PREFERRED EMBODIMENTS

Figure 1:
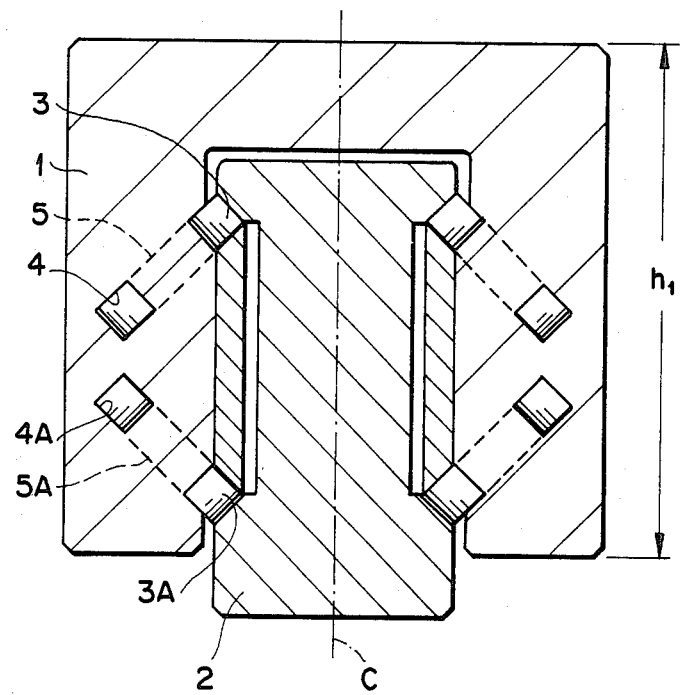
FIGS. 1 and 2 are explanatory diagrams of conventionsl techniques.
Figure 2:
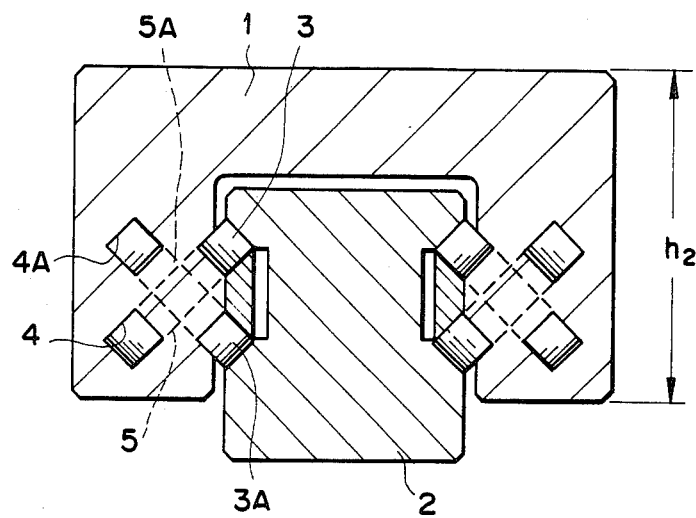

An embodiment of the present invention will now be described hereinbelow with reference to FIGS. 3 to 12. In the diagrams, the same parts and components are designated by the same reference numerals.

Figure 3:
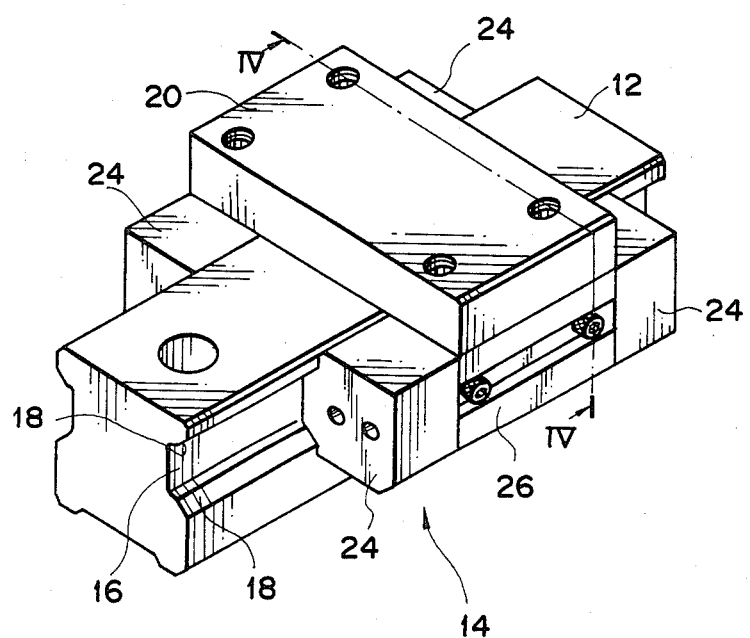
FIG. 3 is a perspective view of a bearing according to the present invention.

In FIG. 3, a roller bearing 10 for an infinite rectilinear motion according to the present invention mainly comprises a truck rail 12 and a slide unit 14. Nearly U-shaped grooves 16 are formed on both sides in the longitudinal direction of the truck rail 12. Truck surfaces 18 are formed in the inclined surfaces of both upper and lower end portions of each of the grooves 16. On the other hand, the slide unit 14 arranged so as to ride over the truck rail 12 includes an attaching base 20 for fixedly attaching other parts to the bearing 10, a bearing plate 22 (see FIG. 4), side plates 24, and return passage covers 26.

Figure 4:
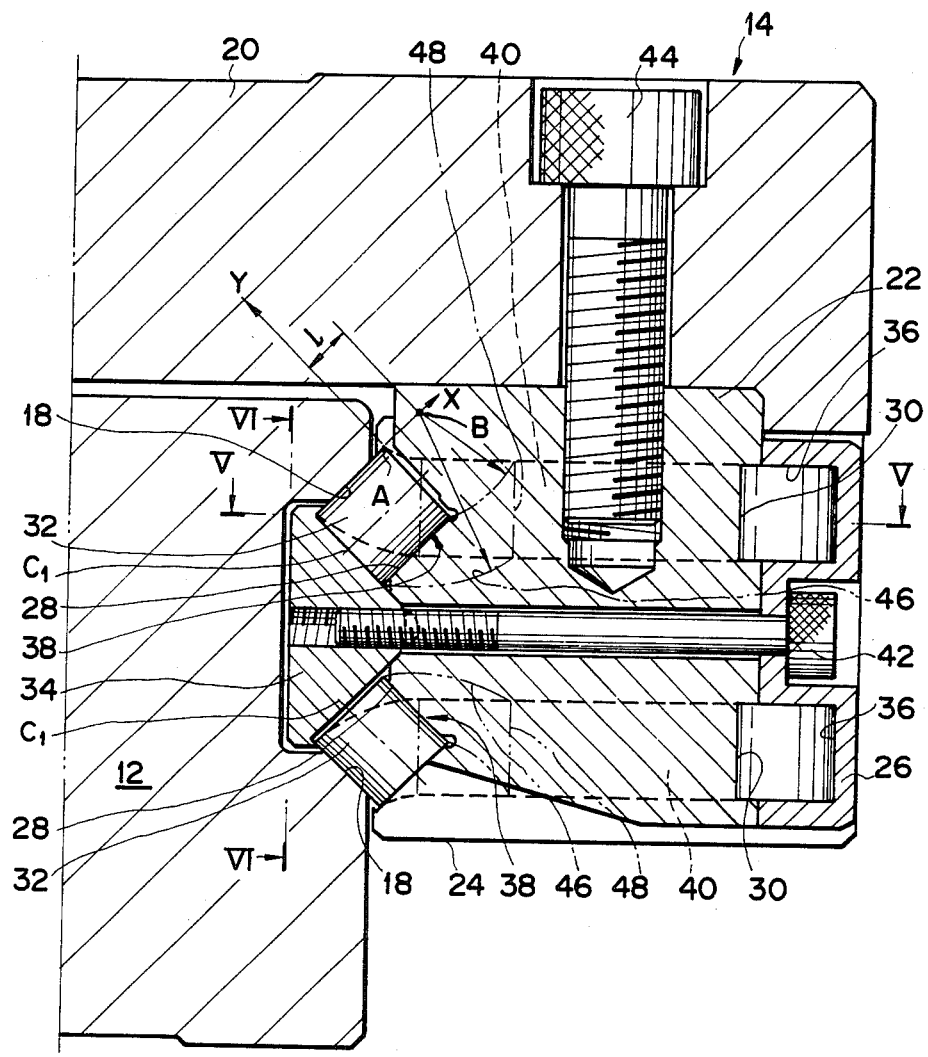
FIG. 4 is a cross sectional front view taken along the line IV—IV in FIG. 3.

FIG. 4 is an enlarged front view showing a cross section taken along the line IV—IV in FIG. 3. The bearing plate 22 is attached to the lower end portion of the attaching base 20. Truck surfaces 28 and return passage grooves 30 are formed in the bearing plate 22. The truck surfaces 28 of the bearing plate 22 face the truck surfaces 18 of the truck rail 12 through cylindrical rollers 32, respectively. A supporting plate 34 is further attached to the slide unit 14 in order to prevent that the rollers 32 which are in contact with the truck surfaces 28 drop and to guide the rollers 32.

Return passages 36 are formed by both of the return passages cover 26 and the bearing plate 22 having the grooves 30. The return passages 36 are communicated with truck grooves 38 formed with the truck surfaces 28 by way of direction change passages 40 indicated by alternate long and two short dashes lines in FIG. 4. The direction change passages 40 are formed in the side plates 24.

The supporting plate 34 and return passage cover 26 are fixed by a common bolt 42 through the bearing plate 22. In this case, these three parts are fixed by one bolt, so that this contributes to a reduction in total number of parts. The bearing plate 22 is fixed to the attaching base 20 by an attaching bolt 44.

When the rollers 32 in the truck grooves 38 (loaded regions) move to the direction change passages 40 (unloaded regions) in the side plates 24, they are led to twisting passages 46 indicated by alternate long and two short dashes lines. The center of curvature of each of the twisting passages 46 is located at an arbitrary point B on an extension line X of the truck surface 18 of the truck rail 12 (in the diagram, the extension line X and point B are shown in only the upper half portion in FIG. 4 for simplification of the drawing). When the rollers 32 move in the twisting passage 46, the central axis $C_1$ of each roller 32 is gradually twisted. (In this invention, the term "twist" means that the inclination of the central axial line of the roller is changed from the oblique direction to the vertical or upright direction.) The central axis $C_1$ is parallel with the center line C (vertical center line of the bearing; refer to FIG. 1) in an outlet portion 48 (portion communicating with the direction change passage 40; this portion is shown as a square indicated by alternate long and two short dashes line in FIG. 4) of the twisting passage 46. In other words, in FIG. 4, if the roller 32 is rotated by an angle of 45° around the point B as a rotational center, the roller will coincide with the position of the outlet portion 48 of the twisting passage 46. After the roller 32 reached the outlet portion 48 of the twisting passage 46, the roller 32 smoothly revolves on the arc in the direction change passage 40 and moves to the return passage 36 as the rectilinear passage.

In FIG. 4, the point B is shown at the location which is away from the highest point A on the edge surface of the roller 32 by only a distance l.

Figure 5:
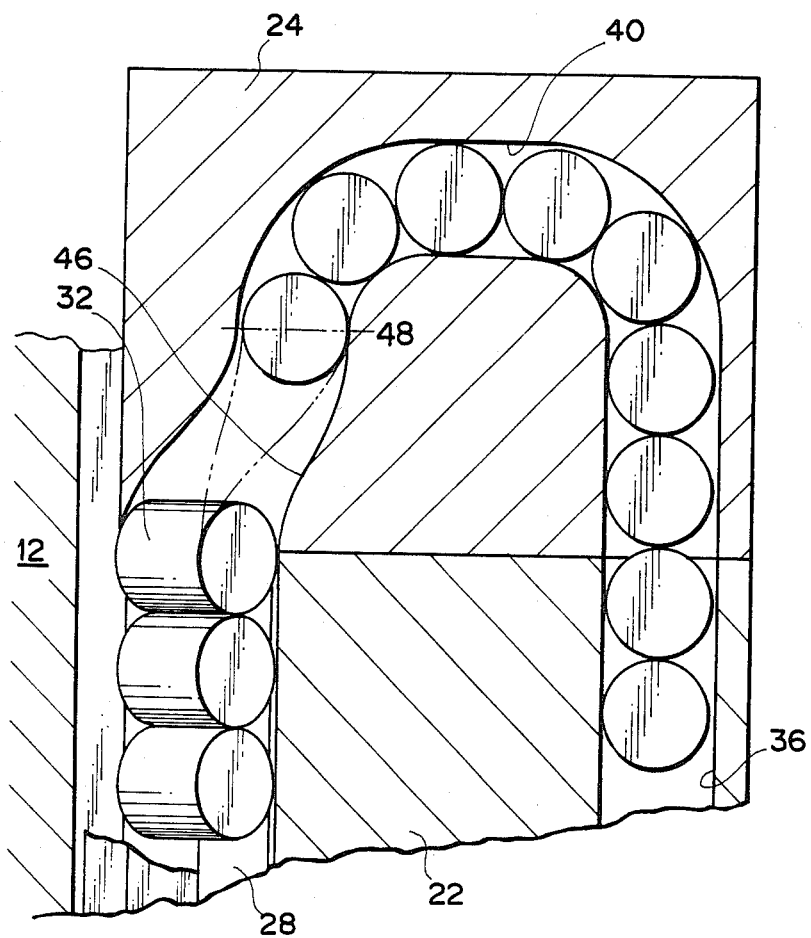
FIG. 5 is a cross sectional plan view taken along the line V—V in FIG. 4.
Figure 6:
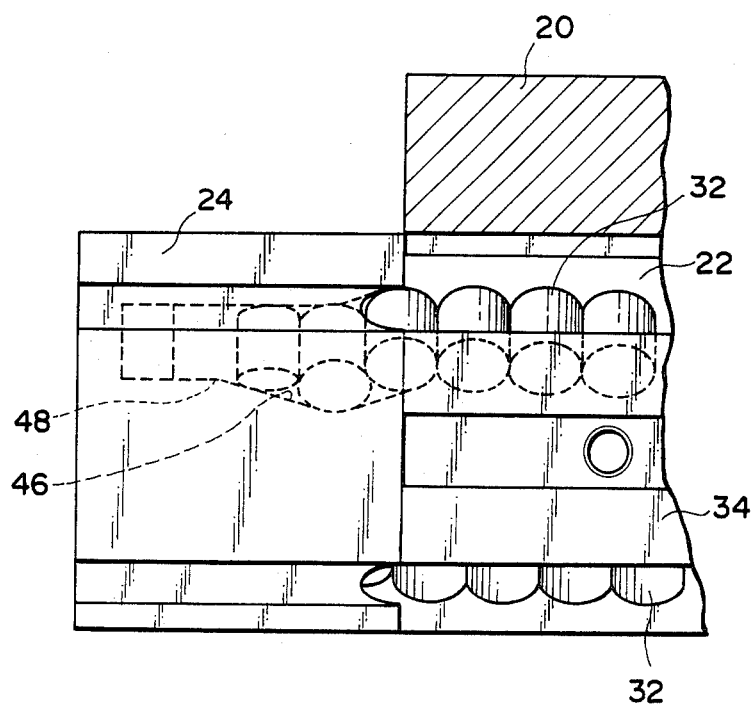
FIG. 6 is a cross sectional side elevational view taken along the line VI—VI in FIG. 4.

FIG. 4 illustrates the twisting passages 46 in the cross sectional front view when it is seen from the slide direction of the slide unit 14. On the other hand, FIG. 5 shows the twisting passage 46 when it is seen from the direction taken along the line V—V in FIG. 4. Referring now to FIG. 5, there is shown a state in which the rollers 32 which are in contact with the truck surface 28 and inclined at an angle of 45° gradually rise in the twisting passage 46 and their central axes become vertical to the drawing paper of FIG. 5 in the outlet portion 48. Similarly, referring to FIG. 6, there is also clearly illustrated a state in which the rollers 32 which are inclined at an angle of 45° enter the twisting passage 46 in the side plate 24 and are subsequently gradually twisted and their central axes are changed so as to become parallel with the drawing paper of FIG. 6. FIG. 6 is a side elevational view when it is seen from the direction taken along the line VI—VI in FIG. 4. In FIG. 6, in the truck grooves (loaded regions), the rollers 32 are guided by the supporting plate 34 and subsequently continuously guided by the side plate 24. Thus, the rollers can also smoothly move in the boundary portion between the truck groove and the twisting passage 46.

Figure 7:
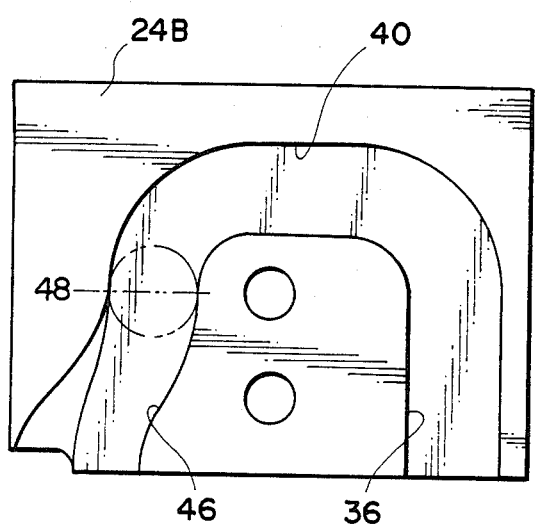
FIGS. 7 and 8 are exploded parts diagrams of a side plate.
Figure 7:
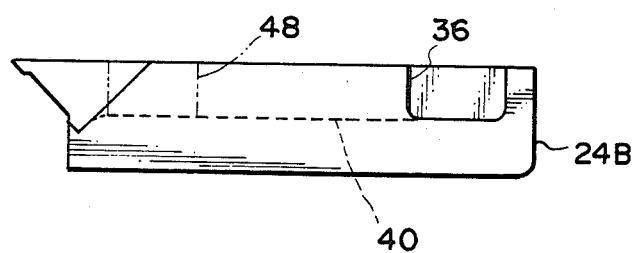
Figure 8:
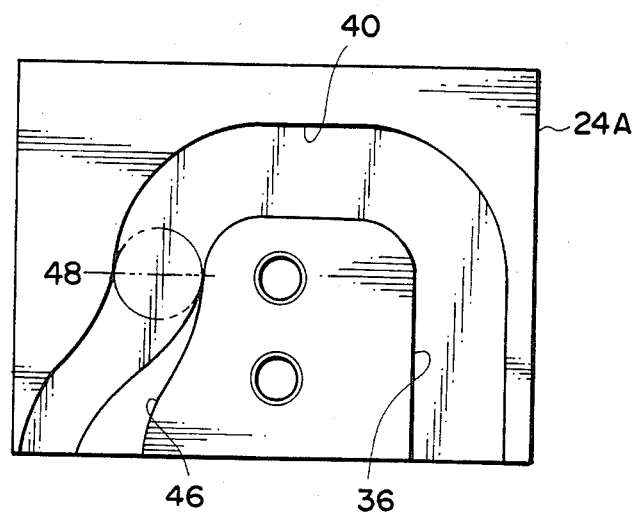
Figure 8:
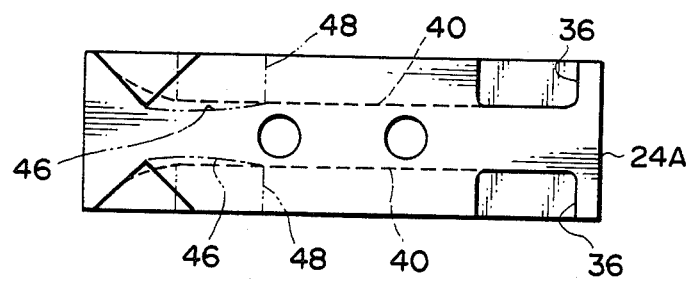

FIGS. 7 and 8 are parts diagrams of the side plate 24 showing an example of a method of forming the side plate 24. By horizontally cutting the direction change passage 40 formed in the side plate 24 into almost equal two portions with regard to the vertical directions, it is divided into a central portion 24A (FIG. 8) and an end portion 24B (FIG. 7). The portions 24A and 24B are individually worked. Another end portion 24B is similarly worked. The central portion 24A shown in FIG. 8 is sandwiched by those two end portions 24B from the upper and lower sides of the central portion 24A, thereby forming the side plate 24 as will be understood from the lower half diagram in FIG. 8. Although only one of the end portions 24B (namely, the upper end portion 24B) is shown in FIG. 7, the other end portion 24B (namely, the lower end portion 24B) is substantially the same as the upper end portion 24B and the upper and lower end portions 24B are symmetrically attached with respect to the central portion 24A. Therefore, the lower end portion 24B is not shown in the diagram.

The method of forming the side plate is not limited to the foregoing method whereby three portions are individually worked and assembled as shown in FIGS. 7 and 8. Other methods can be also considered. For example, the inside portions and outside portions of a series of infinite circulating passages (including the twisting passages 46, direction change passages 40, and return passages 36) are respectively worked, and the inside parts are assembled into the outside parts, thereby completing the side plates.

Figure 9:
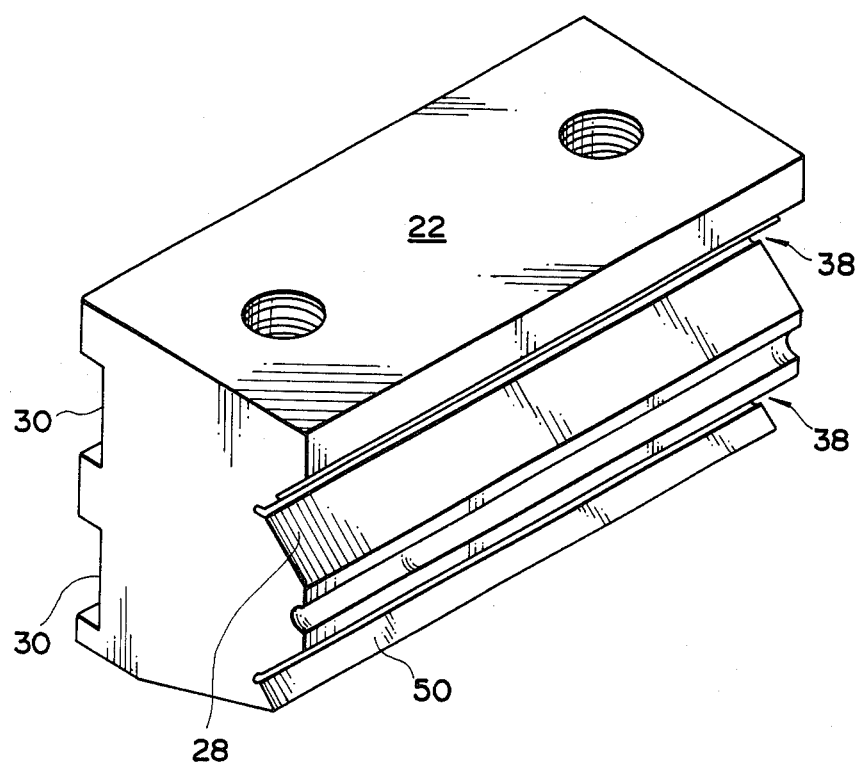
FIG. 9 is a perspective view of a bearing plate.

The bearing plate 22 is shown as a single part in FIG. 9. Two grooves 30 for the return passages 36 are formed on the outside (left side in the diagram) of the plate 22. In addition, two truck grooves 38 are formed on the inside (right side in the diagram) of the plate 22. Each of the truck grooves 38 is constituted by the truck surface 28 which is inclined at an angle of 45° with respect to the horizontal surface and a guide surface 50 (for guiding the rollers) which is adjacent to the truck surface 28 and crosses the truck surface 28 at an angle of inclination of 90° for the truck surface 28. The truck groove 38 and return passage groove 30 are formed on the same horizontal surface, respectively.

Further, well-known escape surfaces may be also formed on both ends in the longitudinal direction of the truck surface 28, thereby enabling the rollers 32 to be smoothly moved and also enabling the slide resistance and moving deviation of the bearing to be reduced.

Figure 10:
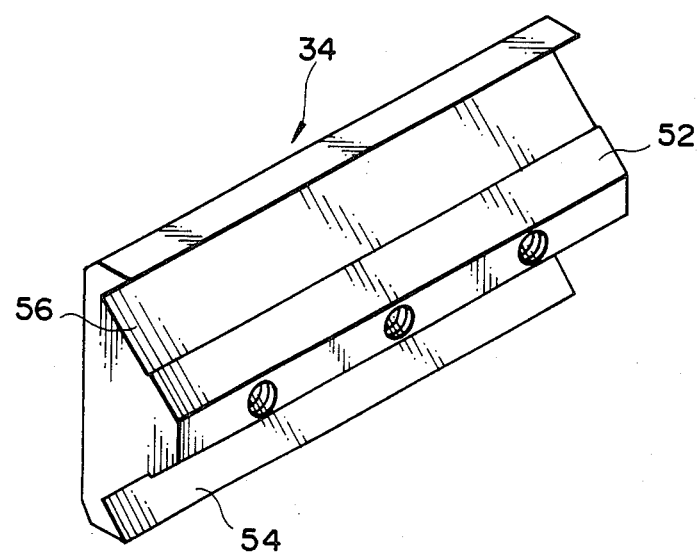
FIG. 10 is a perspective view of a supporting plate.

FIG. 10 shows the supporting plate 34 as a single part. The supporting plate 34 has a guide surface 52 and a supporting surface 54. The guide surface 52 is provided to accurately guide the rollers 32 along the truck surface 18 of the truck rail 12 and the truck surface 28 of the bearing plate 22. The supporting surface 54 is provided to prevent that the rollers 32 drop when the slide unit 14 (FIGS. 3 and 4) is pulled out of the truck rail 12. The escape surface 56 is formed in the guide surface 52 to reduce the guide resistance.

In order to prevent the abrasion of the guide surface 52 which is always in contact with the rollers, the guide surface 52 may be also formed by another material such as steel plate or the like different from the material of the other portions. In such a case, the steel plate to form the guide surface 52 can be molded integrally with a synthetic resin by way of an injection molding and the supporting plate 22 can be formed.

The positional relation between the twisting passage 46 and outlet portion 48 in the cross section as shown in FIG. 4 will now be described further in detail with reference to FIGS. 11A and 11B.

As one embodiment of the present invention, consideration will now be made with respect to the case where the center of curvature of the twisting passage 46 is located at the point B. Namely, the point B is on the extension line X of the truck surface 18 of the truck rail 12 and is away from the highest point A on the edge surface of the roller 32 by only a predetermined distance l. (Namely, in the front cross sectional view, the position of the outlet portion 48 of the twisting passage 46 corresponds to the position where the roller 32 was rotated by an angle of 45° around the point B as a rotational center.) In such an embodiment, FIG. 11A shows the relation between the distances ($l_1$ and $l_2$) of the top portion (highest portion in the diagram) of the roller edge surface from the point A and the positions of the twisting passages (46-1 and 46-2) and of the outlet portions (48-1 and 48-2).

Figure 11A:
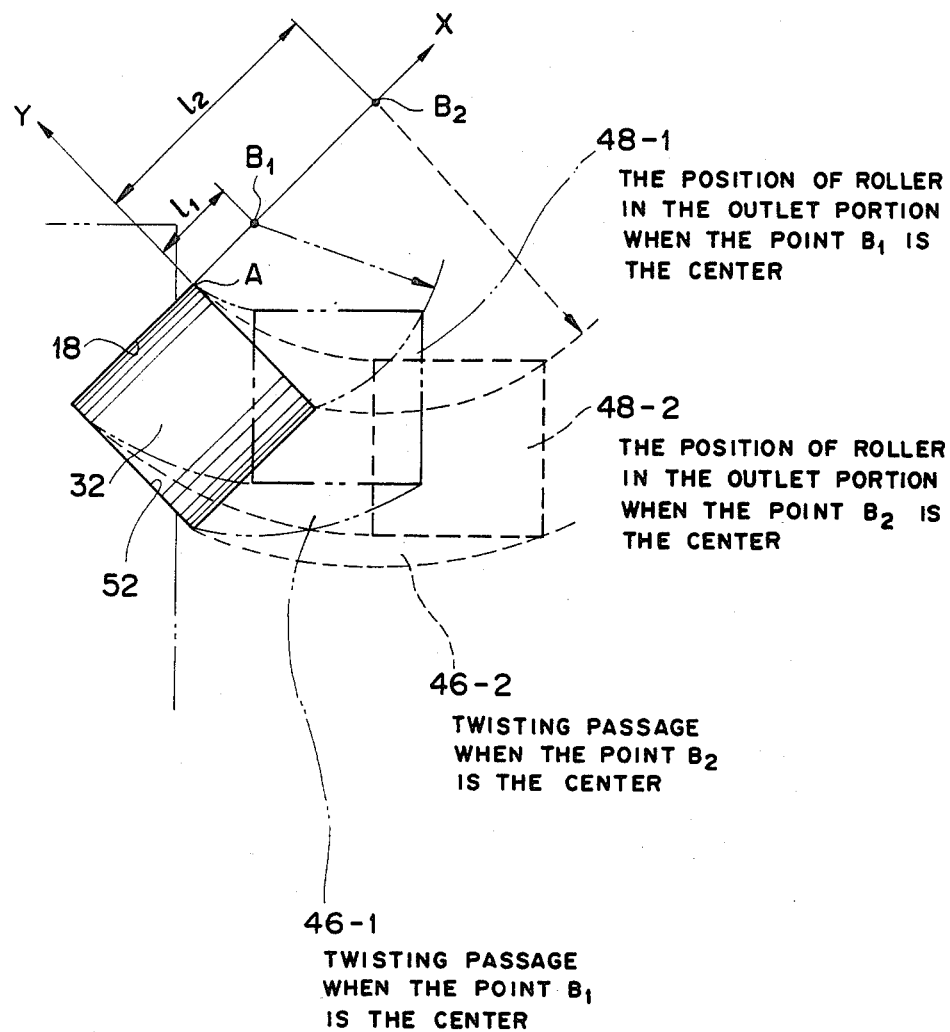
FIGS. 11A and 11B are cross sectional front views for explaining the positions of a twisting passage.

In FIG. 11A, it is assumed that the center of curvature which is away from the point A by only $l_1$ is $B_1$ and the center of curvature which is away from the point A by only $l_2$ is $B_2$. The positions of the twisting passage 46-1 and the outlet portion 48-1 when $B_1$ is the center are shown by alternate long and two short dash lines. The positions of the twisting passage 46-2 and the outlet portion 48-2 when $B_2$ is the center are shown by broken lines. As will be obvious from this diagram, as the value of l increases, the outlet portion 48 of the twisting passage 46 goes away from the truck surface 18 and moves downwardly in the diagram. (In this case, FIG. 11A is a diagram for explaining the upper flow of rolling rollers between two flows of rolling rollers. In the case of the lower flow of rolling rollers, as the value of l increases, the outlet portion of the twisting passage moves upwardly in the diagram.)

As another embodiment of the invention, the center of curvature is not limited to a position on the extension line of the truck surface 18 of the truck rail but can be also set to a position which is away from that position by only a desired angle $\theta$. FIG. 11B is a diagram showing a change in position of the outlet portion 48 of the twisting passage when the angle $\theta$ (using the point A as a rotational center) between the extension line X of the truck surface 18 and the center of curvature B of the twisting passage 46 is changed from 0° to 90° with regard to the upper one of two flows of rolling rollers. In FIG. 11B, point B-0, B-45, B-90 indicate the centers of curvature of the twisting passage in the cases where the angle $\theta$ is 0°, 45°, and 90°, respectively. In FIG. 11B, the twisting passage and the outlet portion when $\theta=0°$ are shown by solid lines. The twisting passage and the outlet portion when $\theta=45°$ are indicated by broken lines. The twisting passage and the outlet portion when $\theta=90°$ are indicated by alternate long and two short dashes lines. As will be apparent from the diagram, as the value of $\theta$ increases, the position of the outlet portion of the twisting passage moves upwardly in the diagram. (When explaining with respect to the lower flow of rolling rollers not shown, the position of the outlet portion moves downwardly in the diagram with an increase in value of $\theta$.)

In this manner, the positional relation between the twisting passage and the truck surface can be changed in accordance with the use object of the bearing. However, by setting the angle $\theta$ of the center of curvature for the extension line X to a value within a range of 0° to 90°, the roller can be moved in the twisting passage without being come into contact with the truck surface of the truck rail.

In other words, the center of curvature B is located in the region which is contained by the highest point A of the end surface of the roller 32, the extension line X of the truck surface 18 of the truck rail, and an extension line Y of the end surface of the roller existing in the outside of the truck rail (on the right side in the diagram). The angle $\angle XAY=90°$.

Under the ordinary use conditions, if the rollers are infinitely circulated in substantially the same horizontal plane, the amount of consumption of the potential energy by the movement of the rollers will be reduced. In addition, when the rollers move in the twisting passages and the direction change passages, the rollers can more smoothly move, so that the slide resistance of the bearing is more reduced. By properly setting the value of $\theta$, the outlet portion 48 of the twisting passage is located in substantially the same horizontal plane as the rollers in the truck groove. Thus, the rollers which move in the twisting passages of the truck grooves, direction change passages, and return passages can move in substantially the same horizontal plane.

Figure 12C:
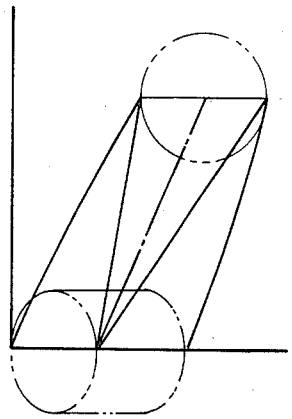

FIGS. 12A to 12C illustrate shapes of the twisting passage 46 in the slide direction thereof (direction shown in FIG. 5).

It is assumed that the side of the truck groove of the twisting passage 46 is the inlet, the opposite side is the outlet, the length of twisting passage in the slide direction from the inlet is L, and the angle of inclination of the central axis of the roller 32 for the direction perpendicular to the drawing paper is $\alpha$. To smoothly move the rollers from the loaded region to the unloaded region, for example, if a cosine curve is used as a curve which expresses the shape of twisting passage 46, the expression which satisfies the conditions such as
  inlet portion: $\alpha=45°$ and $l=0$ mm
  outlet portion: $\alpha=0°$ and $l=15$ mm
will be $$\alpha = 22.5 \times \cos(a \times l) + 22.5$$

where, a is a constant. (To obtain $a \times l_{max}=180°$, $l_{max}=15$ and $a=12$.)

The plane shape of the twisting passage 46 (shape in the slide direction) must be a curved shape such that it slowly deviates toward the inside (as indicated by a curve on the left side in FIG. 12A) at a location near the inlet portion of the twisting passage (position of the inclined roller 32 in FIG. 12A) and at the same time, it also slowly deviates at a location near the outlet portion (position of the roller 32 which stands perpendicularly to the drawing paper in FIG. 12A). When the roller 32 is suddenly deviated toward the insides at the locations of the inlet and outlet portions, the motion of the roller becomes inaccurate and the moving deviation increases, causing the slide resistance to be enlarged.

Further, to reduce the whole length of bearing, the dimension L in the slide direction of the twisting passage 46 must not be so long.

The curve which satisfies the above conditions is not limited to the foregoing cosine curve but a sine curve and a curve consisting of a combination of arcs of different radii of curvature can be also used.

FIGS. 12A to 12C show practical examples of these curves. In the diagrams, an alternate long and short dash line represents a locus which is drawn by the center of gravity of the roller 32 which moves in the twisting passage 46. A solid line indicates ridgelines of four corners of the twisting passage.

FIG. 12A shows an example in which the locus of the center of gravity of the roller 32 draws a cosine curve. In the outlet and inlet portions of the twisting passage 46, the roller 32 is slowly twisted (namely, the ratio of the change in inclination of the central axis of the roller 32 is small). In the intermediate portion of the twisting passage 46, the roller 32 is largely twisted (the ratio of the change in inclination of the central axis of the roller 32 is large).

FIG. 12B shows an example in which the locus of the center of gravity of the roller 32 draws a single arc. The roller is slowly twisted in the portion where the roller is shifted inwardly (to the right in the diagram) at a location near the inlet portion of the twisting passage 46. (In this invention, the term "shift" means that the rollers are moved toward the inside of the direction change passages.) On the other hand, the roller is largely twisted at a location near the outlet portion where the central axis of the roller becomes vertical.

FIG. 12C shows an example in which the locus of the center of gravity of the roller draws a curve which is substantially near a straight line. In this case, the twisting ratio of the roller (ratio of a change in inclination of the central axis of the roller) is almost constant in the overall twisting passage.

Figure 11B:
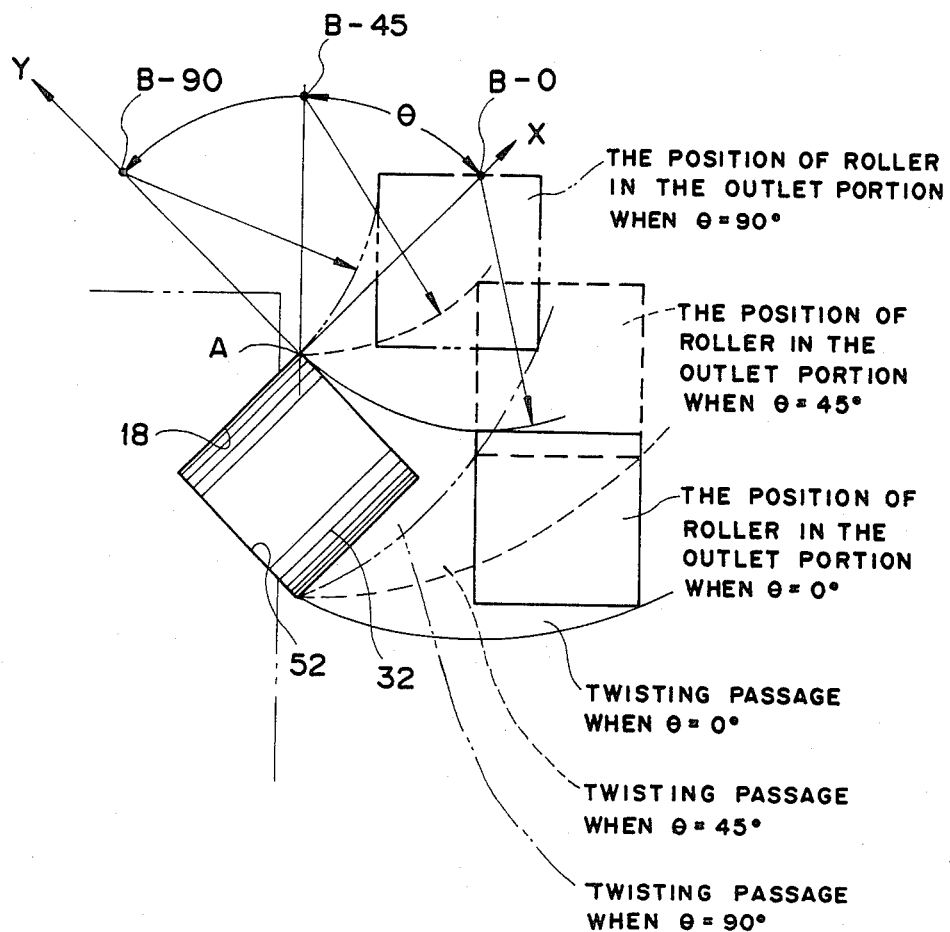

In the invention, as shown in FIGS. 4, 11A, and 11B, the center of curvature (or rotational center) of the twisting passage 46 exists at a location apart from the infinite circulating passage including the twisting passages 46 and direction change passages 40. Practically speaking, the center of curvature is located in the region which is contained by the highest point A of the end surface of the roller 32, the extension line X of the truck surface 18 of the truck rail, and the extension line Y of the roller end surface which exists in the outside (left side in the diagrams) of the truck rail. Therefore, each side (each ridgeline of four corners) of the twisting passage is largely away from the truck surface) deviated to the right in the diagrams). Thus, the rollers which moves in the twisting passage can be easily and certainly led (shifted) to the direction changed passage.

In addition, at a location near the truck groove, the wall surface of the twisting passage is formed by an arc having a large radius of curvature. As the position of the wall surface of the twisting passage is away from the truck groove, the wall surface is formed by an arc having a small radius of curvature. Therefore, the rollers can be smoothly shifted at a location near the inlet portion of the twisting passage 46.

To form the optimum twisting passage with respect to each bearing, it is preferable that the center of cuvature B of the twisting passage is set in the region which is contained by the extension lines X and Y (FIGS. 4 and 11) and is located over the point A. At the same time, it is desirable to properly set the distance l between the points A and B and the angle $\theta$ between the straight line AB and the extension line X. Therefore, the design and machining costs are reduced. The rollers can smoothly move in the twisting passage formed as described above and the central axis of each roller gradually becomes vertical (in the state in which the central axis of the roller is located in the vertical direction) from the state (in the loaded region) which is inclined at an angle of 45° from the vertical direction. In the outlet portion of the twisting passage, the central axis of the roller is located in the vertical direction (direction parallel with the center line C not shown in FIG. 4). Thus, the rollers can move in the direction change passage and return passage which are formed in the same horizontal plane as the truck groove. Therefore, in the parallel roller type bearing consisting of four flows of rolling rollers, the truck groove and return passage can be formed in substantially the same horizontal plane.

The invention is not limited to only the roller bearing shown in FIG. 3 but can be also applied to the truck groove portion of wellknown similar roller bearings for an infinite rectilinear motion. For example, instead of the type in which the U-shaped grooves are formed in the side walls of the truck rail as in the foregoing embodiment, the invention can be also applied to a type such that projections are formed on both flange portions of the truck rail in the longitudinal direction and the flows of rolling rollers are formed so as to sandwich the projections on both sides, and the like.

In the infinite circulating passage of the rollers consisting of four flows of rolling rollers, the invention can be also embodied to only the lower one of the upper and lower flows of rolling rollers in dependence on the use condition of the bearing.

The technologies such that the attaching base and bearing plate are integrally formed and the return passage cover is also integrally constituted and the like are the well-known technologies and can be embodied to the present invention.

Although the bearing in which the central axes of the rollers in the truck groove are inclined at an angle of 45° from the center line of the bearing has been shown in the embodiments, the invention can be also easily applied to a bearing in which the rollers are inclined at an angle other than 45° (for example, 30° or the like).

As another embodiment of the invention, the portion of merely shift the rollers without twisting them, namely, the portion to move the rollers inwardly of the bearing plate without changing the inclination of central axes of the rollers can be formed between the twisting passage and the truck groove. In this case, it is sufficient that the length of portion to merely shift the rollers without twisting them is equal to or shorter than the diameter of roller.

The advantages of the present invention will be summarized hereinbelow.

(1) The twisting passage of the direction change passage can gradually, certainly, and simultaneously twist and shift the rollers.
(2) The slide resistance of the bearing is small since the rollers stably move in the twisting passage.
(3) The bearing can be miniaturized in spite of the roller bearing consisting of four flows of rolling rollers.
(4) The moving deviation can be reduced.
(5) The bearing can be cheaply manufactured.

Although the present invention has been shown and described with respect to preferred embodiments, various changes and modifications which are obvious to a person skilled in the art to which the invention pertains are deemed to lie within the spirit and scope of the invention.

What is claimed is:
1. A roller bearing for an infinite rectilinear motion comprising:
   a long truck rail (12) in which an inclined surface formed in a part of an outside wall surface is used as a truck surface (18);
   a slide unit (14) which rides over said truck rail (12) and in which a truck surface (28) is formed at a location which faces said truck surface (18);
   a number of cylindrical rollers (32) arranged between the truck surface (18) of said truck rail (12) and the truck surface (28) of said slide unit (14) on the basis of a parallel roller type;
   a truck groove (38) including said truck surface (28);
   an infinite circulating passage for said cylindrical rollers (32) including said truck groove (38); and
   said truck groove (38) and said infinite circulating passage being formed in said slide unit (14); characterized in that
   side plates (24) are attached to both end portions of the slide unit (14), within each of which plates (24) a direction change passage (40) being communicated with the truck groove (38) and being located in the same horizontal plane as the truck groove (38) is formed;
   a twisting passage (46) is formed between said direction change passage (40) and said truck groove (38), in which twisting passage (46) each of the cylindrical rollers (32) moves so as to be gradually twisted until a central axis ($C_1$) of the cylindrical roller (32) is located in a vertical direction, and at the same time, the cylindrical roller (32) moves from the truck groove (38) into an unloaded region so as to be shifted;

and in a cross section which is perpendicular to a slide direction of the bearing, a center of curvature (B) of said twisting passage (46) is located in a region which is contained by an extension line (X) of the truck surface (18) of the truck rail (12) and an extension line (Y) of an end surface of the roller in the outside of the truck rail (12).

2. A roller bearing according to claim 1, wherein in the cross section which is perpendicular to the slide direction of the bearing, said center of curvature (B) is located on the extension line (X) of the truck surface (18) of the truck rail (12).

3. A roller bearing according to claim 1, wherein in a cross section which is parallel with the slide direction of the bearing, said twisting passage (46) is formed in a manner such that a radius of curvature is large at a location near the truck groove (38), and a radius of curvature is reduced as the twisting passage is away from the truck groove (38).

4. A roller bearing according to claim 3, wherein said twisting passage (46) is formed in a manner such that a locus of the center of gravity of the cylindrical roller (32), which moves in the twisting passage (46), draws a cosine curve.

5. A roller bearing according to claim 1, wherein in a cross section which is parallel with the slide direction of the bearing, the twisting passage (46) is formed in a manner such that a locus of the center of gravity of the cylindrical roller (32), which moves in the twisting passage (46), draws a single arc.

6. A roller bearing according to claim 1, wherein in a cross section which is parallel with the slide direction of the bearing, the twisting passage (46) is formed in a manner such that a locus of the center of gravity of the cylindrical roller (32), which moves in the twisting passage (46), draws a curve which is near a straight line.

* * * * *